(12) United States Patent
Ouyang et al.

(10) Patent No.: US 12,108,493 B2
(45) Date of Patent: Oct. 1, 2024

(54) SEAMLESS ROLE SWITCH FOR TRUE WIRELESS EAR BUDS

(71) Applicant: Google LLC, Mountain View, CA (US)

(72) Inventors: Xuemei Ouyang, Mountain View, CA (US); Jeffrey Kuramoto, Mountain View, CA (US); Shijing Xian, Sunnyvale, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 245 days.

(21) Appl. No.: 17/599,740

(22) PCT Filed: Jun. 20, 2019

(86) PCT No.: PCT/US2019/038182
§ 371 (c)(1),
(2) Date: Sep. 29, 2021

(87) PCT Pub. No.: WO2020/256726
PCT Pub. Date: Dec. 24, 2020

(65) Prior Publication Data
US 2022/0159782 A1 May 19, 2022

(51) Int. Cl.
*H04L 1/00* (2006.01)
*H04W 84/20* (2009.01)
(52) U.S. Cl.
CPC ........... *H04W 84/20* (2013.01); *H04L 1/0061* (2013.01)
(58) Field of Classification Search
CPC ........ H04W 84/20; H04W 4/80; H04L 1/0061
See application file for complete search history.

(56) References Cited

U.S. PATENT DOCUMENTS

| 9,462,109 | B1* | 10/2016 | Frazier Fields | ....... H04W 4/025 |
| 2004/0203384 | A1 | 10/2004 | Sugikawa et al. | |
| 2013/0316642 | A1 | 11/2013 | Newham | |
| 2016/0073188 | A1 | 3/2016 | Linden et al. | |
| 2017/0311105 | A1 | 10/2017 | Hariharan et al. | |
| 2020/0252993 | A1* | 8/2020 | Srivastava | ............ H04W 36/30 |

FOREIGN PATENT DOCUMENTS

| CN | 105898672 | 8/2016 |
| CN | 107894881 | 4/2018 |
| CN | 107950014 | 4/2018 |

(Continued)

OTHER PUBLICATIONS

"Foreign Office Action", JP Application No. 2021-558608, Dec. 20, 2022, 11 pages.

(Continued)

*Primary Examiner* — Joseph E Dean, Jr.
(74) *Attorney, Agent, or Firm* — Colby Nipper PLLC

(57) ABSTRACT

Role switch between wirelessly paired master/slave devices may be performed without perceived glitches in audio. The devices negotiate an anchor point, such as a point in time or a point in relation to other events, for performing the role switch. To prepare for the role switch prior to the anchor point, the devices communicate a variety of information, such as information for communicating with the host device after the role switch and information for bit processing after the role switch. The slave device may use such information to serve in the master role, without the host knowing that a role switch occurred.

20 Claims, 13 Drawing Sheets

(56) References Cited

FOREIGN PATENT DOCUMENTS

| CN | 108600897    | 9/2018  |
|----|--------------|---------|
| CN | 109660906    | 4/2019  |
| JP | 2003333666   | 11/2003 |
| JP | 2018526914   | 9/2018  |
| JP | 2018160945   | 10/2018 |
| KR | 20180029081  | 3/2018  |
| WO | 2016036309 A1 | 3/2016 |

OTHER PUBLICATIONS

International Search Report and Written Opinion for International Application No. PCT/US2019/038182 dated Feb. 13, 2020. 16 pages.
International Preliminary Report on Patentability for International Application No. PCT/US2019/038182 dated Dec. 30, 2021. 11 pages.
"Foreign Office Action", JP Application No. 2021-558608, Mar. 28, 2023, 4 pages.
"Foreign Office Action", KR Application No. 10-2021-7030273, Sep. 20, 2023, 12 pages.
"Foreign Office Action", CN Application No. 201980094911.6, Oct. 18, 2023, 19 pages.
"Foreign Office Action", IN Application No. 202147045629, Mar. 1, 2024, 6 pages.
"Foreign Office Action", CN Application No. 201980094911.6, Jun. 28, 2024, 7 pages.

\* cited by examiner

SEAMLESS ROLE SWITCH FOR TRUE WIRELESS EAR BUDS

CROSS-REFERENCE TO RELATED APPLICATION

This application is a national phase entry under 35 U.S.C. § 371 of International Application No.: PCT/US2019/038182, filed on Jun. 20, 2019, the entire disclosure of which is incorporated herein by reference.

BACKGROUND

Full wireless earbuds are two earbuds that connect to each other wirelessly. Typically such full wireless earbuds follow a relay format or a sniff format. In the relay format, one earbud serves a master role, and the other earbud serves a slave role. The master earbud receives audio from a host, e.g., a mobile phone or other audio playback device, then relays the audio to the slave earbud. In the sniff format, one earbud is a primary earbud, and the other earbud is a secondary earbud. The primary earbud receives and acknowledges audio packets from the host, while the secondary earbud only receives audio, or "sniffs," without any acknowledgement to the host. If the secondary earbud loses packets, it will ask the primary earbud to re-transmit the packets.

Role switch between two earbuds happens when the roles of earbuds change. For example, for relay format earbuds, the master becomes the slave, and the slave becomes the master. For sniff format earbuds, the primary earbud becomes secondary, and the secondary earbud becomes primary.

Wireless earbuds in relay format typically have a first asynchronous connection-less (ACL) link between the host device and the master earbud, where the master earbud is a Bluetooth slave in this ACL link A second ACL link exists between the master earbud and the slave earbud. In this second ACL link, the master earbud is the Bluetooth master, and the slave earbud is the Bluetooth slave.

In this format, it is very difficult to achieve seamless role switch. For example, most, if not all, profiles in the ACL link between the master earbud and the host device need to be transferred to the slave earbud silently, so that after role switch the new master earbud can continue receiving audio packets. Further, a Bluetooth role switch is also required as the old master earbud becomes the new slave earbud, while the old slave earbud becomes new master earbud, because the master earbud should also be the Bluetooth master to be efficient at Bluetooth transmission. Practically, the master and slave role switch requires the master bud to first ask the host device (e.g., smartphone) to suspend audio playing and to then disconnect from the host. The slave bud then establishes a connection with the host device and becomes the new master bud. Then new master will then establish connection with the new slave and relay phone audio content to the new slave. By then the role switch is considered to be finished, and the audio can resume. However, since audio needs to be stopped during this process without user intervention, the user will hear an audio glitch and consider the earbuds to have poor audio quality. This is particularly true in situations where role switch may occur more frequently.

BRIEF SUMMARY

Role switch may be desirable if, for example, the slave earbud has better received signal strength, if the master earbud is running on lower battery than the slave, if the master earbud is taken out of the user's ear or put in a case, etc. The present disclosure provides for a role switch between paired accessories, such as earbuds, in a way that is seamless to avoid audio glitching. The role switch between the accessories may be unknown to the host device.

One aspect of the disclosure provides a wireless accessory device, including a wireless communication interface adapted for communication with a host device and a second wireless accessory device, a memory, and one or more processors in communication with the memory. The one or more processors may be configured to execute a first set of operations to role switch from a master mode to a slave mode, the first set of operations comprising negotiating an anchor point for role switch, sending logical link information for communicating with the host device to the second wireless device, sending bit processing information to the second wireless device, performing role switch at the negotiated anchor point, and receiving packets relayed through the second wireless device after the anchor point.

The anchor point may be a point in time of predetermined length in the future, wherein the predetermined length corresponds to an amount of time needed for sending the logical link information and sending the bit processing information. In other examples, the anchor point may correspond to a particular event, such as obtaining a particular status or transmission of a packet. According to some examples, sending the bit processing information may include exchanging cyclic redundancy check and header error check states with the second wireless device. The bit processing information may include, for example, decoder states. The one or more processors may further send an adaptive frequency hopping (AFH) channel map.

According to some examples, the one or more processors may be further configured to execute a second set of operations to role switch from the slave mode to the master mode. Such second set of operations may include negotiating a second anchor point for role switch, receiving logical link information from the second device for communicating with the host device, receiving bit processing information from the second wireless device, assuming the master mode at the negotiated anchor point, receiving packets directly from the host device after the switch anchor point, and relaying the received packets to the second device.

Another aspect of the disclosure provides a method for role switching from a slave role to a master role. The method may include negotiating, using one or more processors, an anchor point for role switch, receiving logical link information from a wirelessly paired device in the master role, the logical link information for communicating with the host device, receiving, from the wirelessly paired device in the master role, bit processing information, establishing direct communication with the host device using the received logical link information, at or after the anchor point, and receiving packets directly from the host device after the switch anchor point.

Yet another aspect of the disclosure provides a method for role switching from a master mode to a slave mode, including negotiating, by one or more processors of a first device operating in the master mode, an anchor point for role switch, sending, by the one or more processors, logical link information for communicating with a host device to a second device operating in the slave mode, sending, by the one or more processors, bit processing information to the second device, performing role switch to the slave mode at the negotiated anchor point, and receiving packets relayed through the second device after the anchor point.

DETAILED DESCRIPTION

The present disclosure provides for role switch between earbuds, or other paired wireless accessories having master/slave roles, in a way that is transparent to the host device. No audio pause or disconnection is needed during the switch process. Accordingly, the switch may be performed with perceptible continuity of audio streaming.

A first wireless accessory device, such as a first earbud, in a master role requests to serve as master to both a host device and a second device in a slave role. In this regard, the first device can be a master clock for both a host connection between the first device and the host, and a device connection between the first device and the second device. Both of the first and second devices listen to the host. The first device in the master role receives audio contents from the host, and relays the audio contents to the second device in the slave role. The second device in the slave role also listens to the host device, between receiving relayed audio from the master, to monitor the signal strength between the second (slave) device and the host. The second (slave) device does not need to directly receive audio contents from the host.

When the first device in the master role observes its signal strength drop below a preset threshold, it sends a message to the second device to request its signal strength. If the second device in the slave role has better signal strength than the first device for a predefined period of time, the first device may request a role switch with second device.

When the role switch procedure starts, the first device in the master role does not need to ask the host device to suspend audio or disconnect from the host device. Rather, the first and second devices communicate information. In particular, the first and second devices agree on a predetermined switch anchor point, such as a point in time for performing the role switch. The first device in the master role further provides an audio link header for communicating the host device to the second device in the slave role. In this regard, the second device can use the audio link header to communicate with the host device beginning at the switch anchor point. The first and second devices further exchange cyclic redundancy check (CRC) and header error check (HEC) states from different randomization kernels. This allows for continuity of bit processing. The first device further provides its alternative frequency hopping (AFH) channel map to the second device. This may be performed any time the AFH channel map changes, such that the second device may listen to the host to determine its updated signal strength with respect to the host. After the role switch, when the second device has become the new master, audio decoder states may be sent from the first device (the old master) to the second device (the new master). This may allow for continuous decoding of audio packets on the second device in the new master role.

Figure 1:
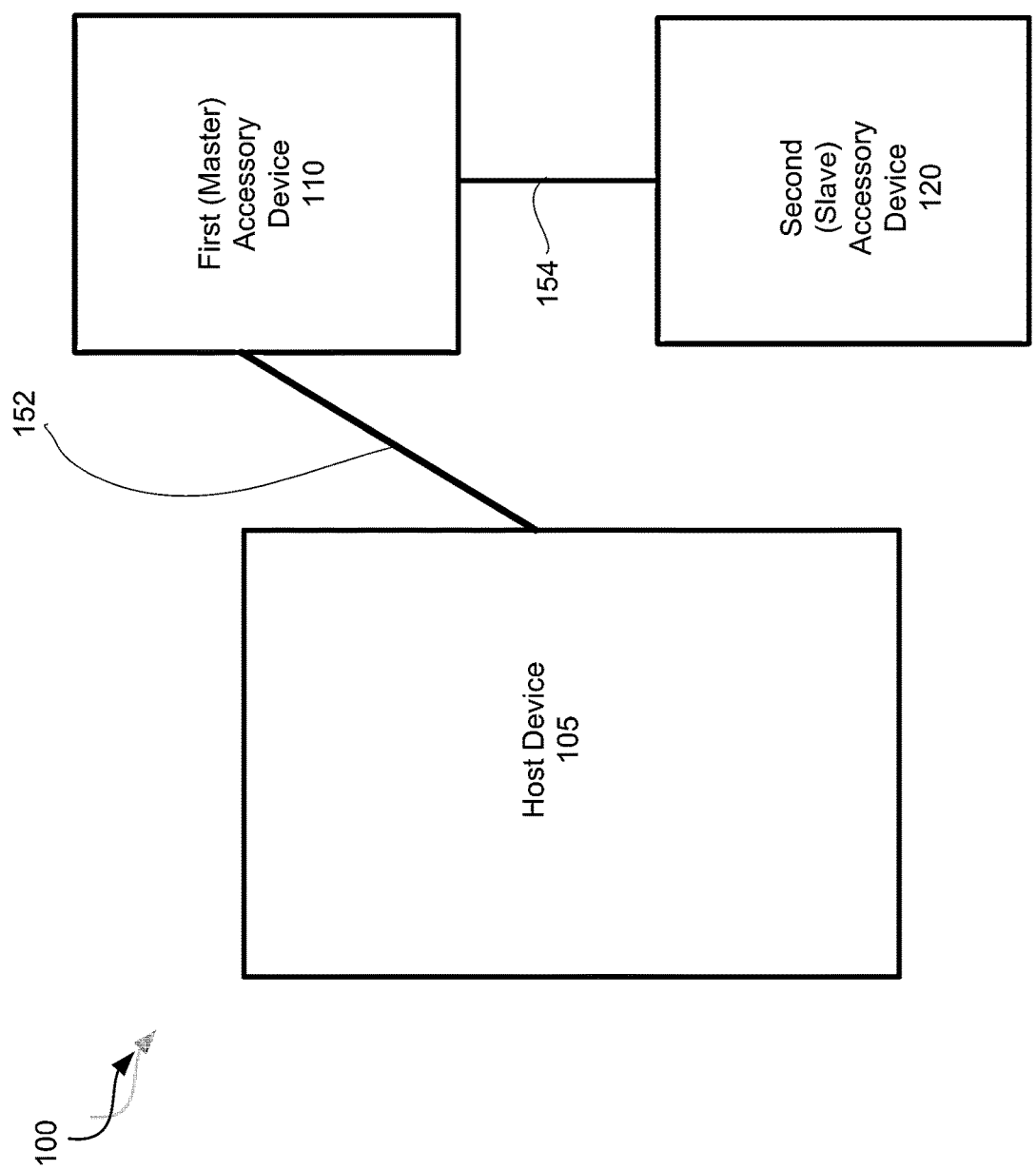
FIG. 1 is a block diagram illustrating an example system according to aspects of the disclosure.

FIG. 1 illustrates an example system 100 including a host device 105 communicatively coupled to first accessory device 110. The first accessory device 110 may be one of a pair of accessory devices, such as earbuds, wireless speakers, etc. The first device 110 may be operating in a master role. As such, in addition to being coupled to the host device, the first device 110 is further communicatively coupled to second accessory device 120, which is operating in a slave role.

The connection between the devices 105, 110, 120 may be, for example, short range wireless pairing, such as Bluetooth. For example, host device 105 may be coupled to first device 110 via a host communication link 152, such as a first asynchronous connection-less (ACL) link, a synchronous connection-oriented (SCO) link, etc. The first device 110 may be coupled to the second device 120 via a relay communication link 154, such as second ACL link.

Figure 2:
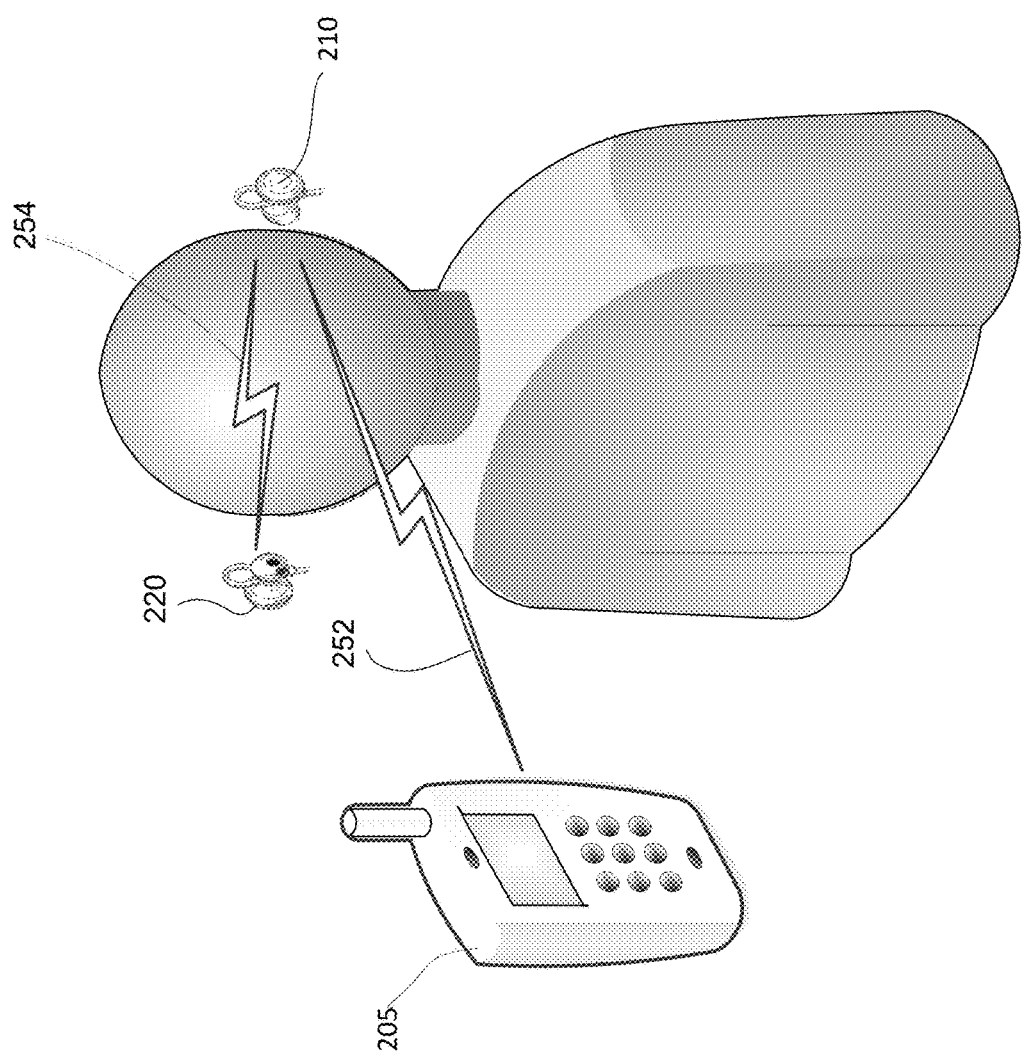
FIG. 2 is an example pictorial diagram of the system of FIG. 1.

FIG. 2 illustrates an example of the system of FIG. 1, wherein the host device is a mobile phone 205, the first device operating in the primary role is a first earbud 210, and the second device operating in the secondary role is a second earbud 220. Host communication link 252 exists between the phone 205 and the first earbud 210, while relay communication link 254 exists between the first earbud 210 and the second earbud 220.

While the host device in this example is illustrated as a mobile phone, it should be understood that the host device may be any of various types of devices adapted to transmit audio signals. For example, the host device may be a tablet, smart watch, game system, music player, laptop, personal digital assistant device, or any other computing device. Similarly, the first and second accessories, while here shown as earbuds 210, 220, may in other examples be any combination of speakers or other audio devices, video output displays, etc. The first and second accessories may be paired during a time of manufacture, or may be sold separately and paired later by a user.

In some instances, it may be desirable for the first and second accessories to switch roles. For example, the earbud serving in the primary role may have a lower quality signal strength connection with the host as compared to a possible connection between the host and the device in the secondary role. In the arrangement of FIG. 2, the first earbud 210 is subject to cross-body path loss with respect to the host device 105, because the host device 105 is being held on an opposite side of the user's body. The second earbud 220, in contrast, is on a same side of the user's body as the host device 105. Accordingly, the second earbud 220 is subject to less cross-body path loss than the first earbud 210.

Figure 3B:
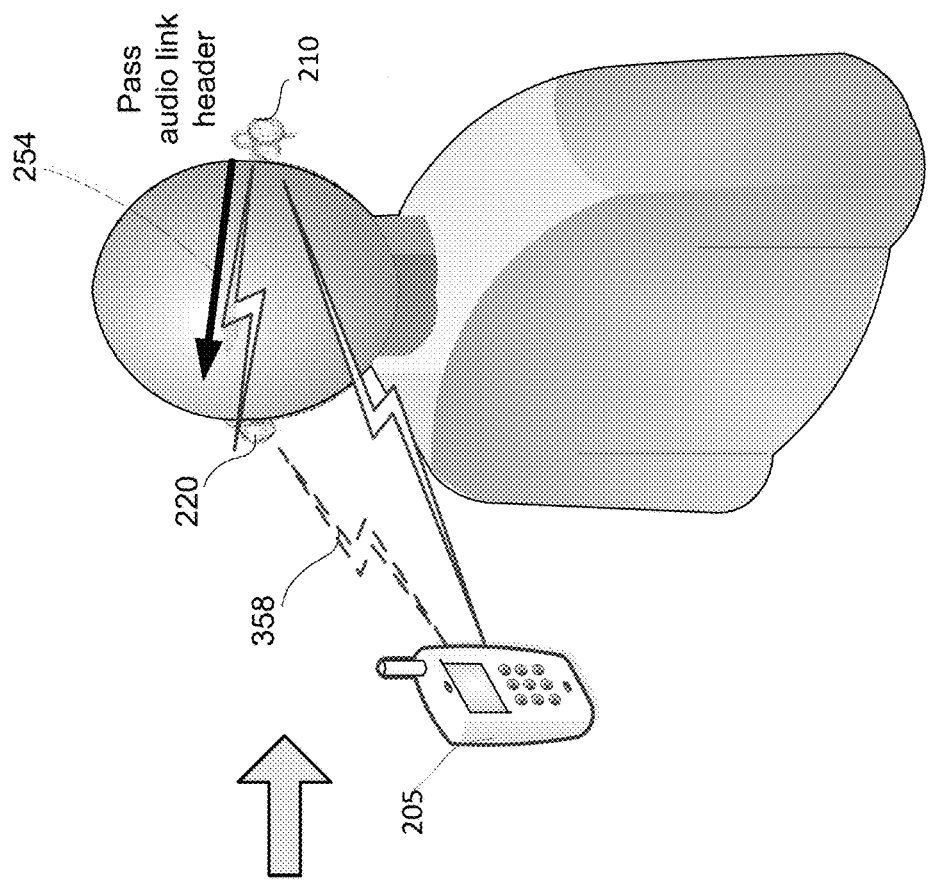
FIGS. 3A-F are pictorial diagrams illustrating role switching according to aspects of the disclosure.
Figure 3A:
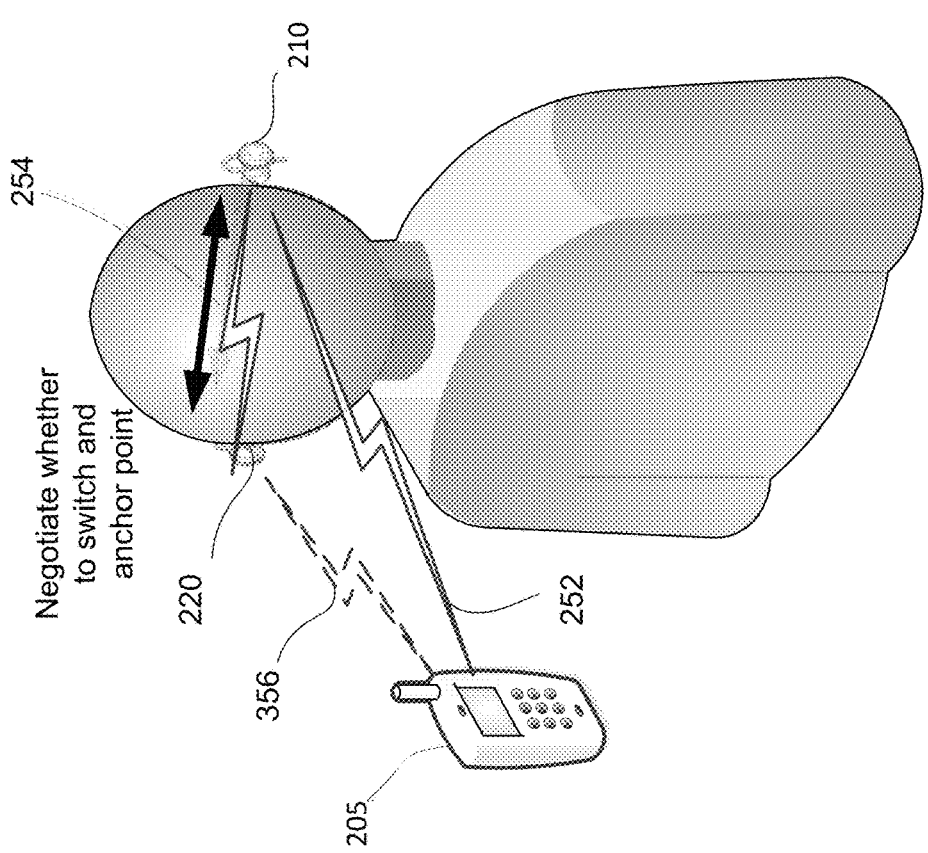

FIGS. 3A-E illustrate an example of the role switch. In FIG. 3A, the second device 220 operating in the slave mode evaluates a potential connection 356 between the host 205 and the second device 220. For example, the second device 220 may listen in on transmissions between the host 205 and the first earbud 210 over the host communication link 252. For each transmission, the second earbud 220 may determine signal quality metrics for the potential connection 356, and forward such metrics to the first earbud 210 over the relay link 254. Examples of such metrics may include RSSI, average signal strength, etc. The first earbud 210 may similarly determine such metrics for its communications over the host link 252. The first earbud 210 may forward its determined metrics to the second earbud 220. Accordingly, the earbuds 210, 220 can negotiate whether to switch roles based on a comparison of the signal quality metrics. According to some examples, the decision whether to switch roles may be further based on other conditions, such as battery levels of the first and second devices, etc. For example, the device serving in the master role may consume more power than the device serving in the slave role. Accordingly, when a battery of the master device drains to a predetermined level, for example, it may be desirable to switch roles with the slave device.

While in some examples the decision whether to swap roles may be made by both the first and second devices 210, 220, in other examples the decision may be made by only one or a subset of the devices. For example, the second earbud 220 may forward the signal quality metrics for the potential connection 356 to the first earbud 210, which compares it to its own metrics and decides whether to initiate a role switch. Alternatively, the first earbud 210 may forward its determined metrics to the second earbud 220, which performs the comparison and determines whether to initiate a role change.

As further shown in FIG. 3A, when the first and/or second devices 210, 220 decide to swap roles, the first and second devices communicate information. In particular, the first and second devices 210, 220 communicate to determine a predefined switch anchor point. The predefined switch anchor point may be a future point in time when the devices will switch roles. The future point in time may be a time when the first and second devices have completed preparation for the switch, a time when the switch will have a least impact on audio quality, or any combination of these or other facts.

As shown in FIG. 3B, the first device 210 in the master role further provides an audio link header, for communicating with the host device 205, to the second device 220 in the slave role. In this regard, the second device 220 can use the audio link header to communicate with the host device 205 beginning at the switch anchor point.

Figures 3C, 3D:
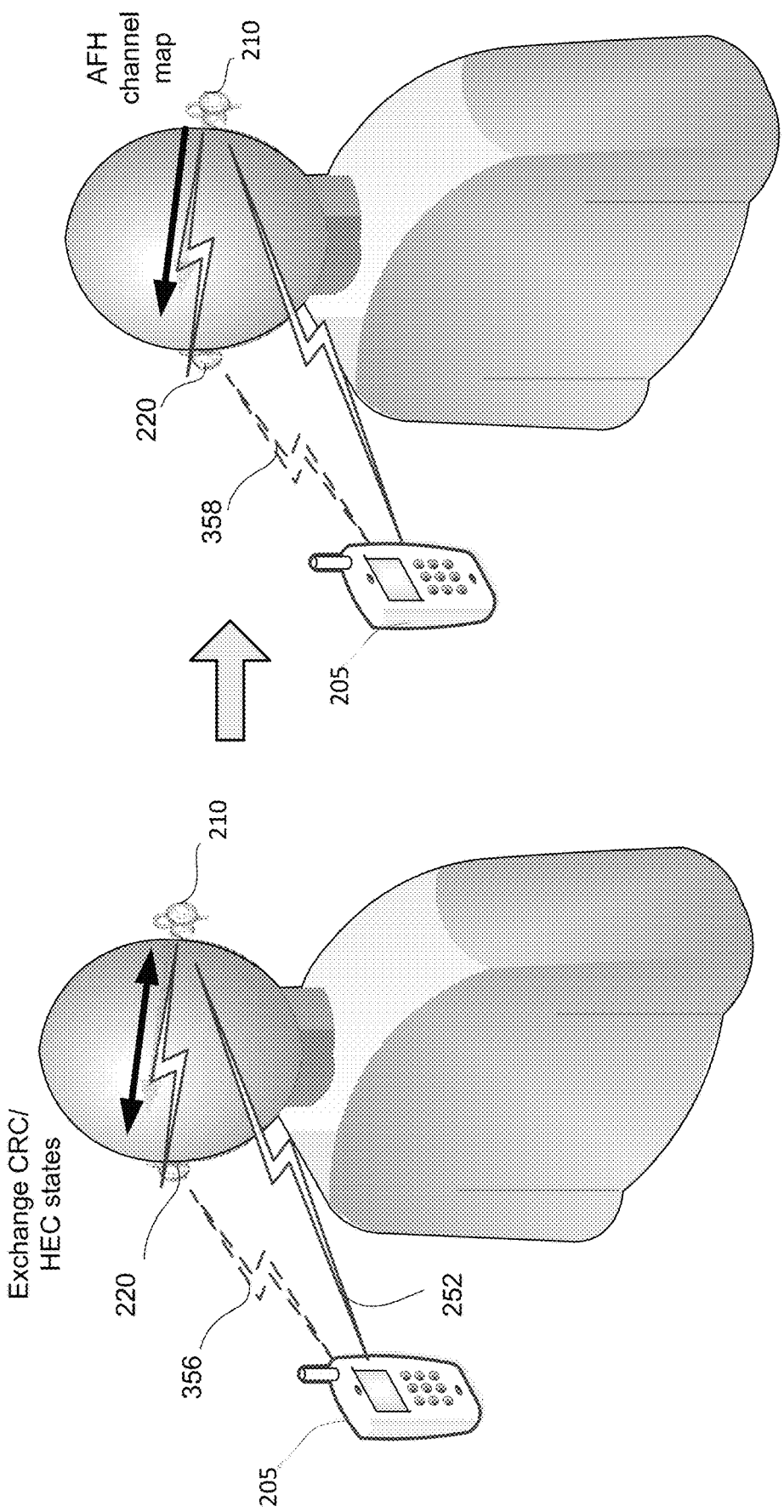

As shown in FIG. 3C, the first and second devices further exchange cyclic redundancy check (CRC) and header error check (HEC) states from different randomization kernels. This allows for continuity of bit processing. This is described further below in connection with FIGS. 5-7.

As shown in FIG. 3D, the first device further provides its alternative frequency hopping (AFH) channel map to the second device. This may be performed any time the AFH channel map changes, such that the second device may listen to the host to determine its updated signal strength with respect to the host.

Figure 3F:
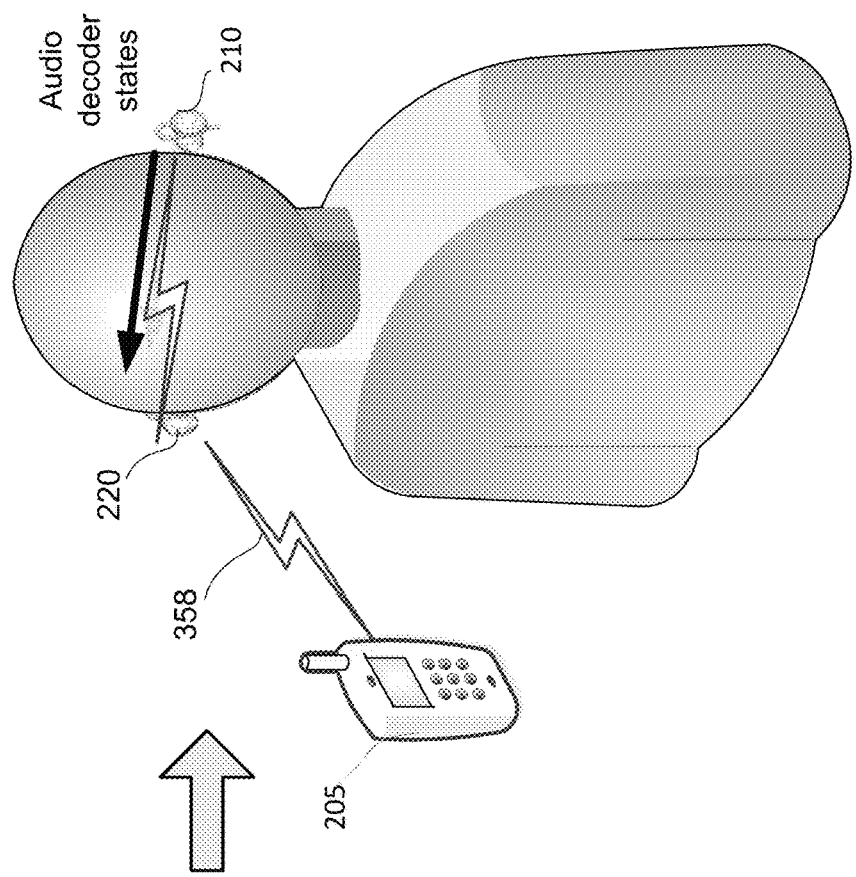
Figure 3E:
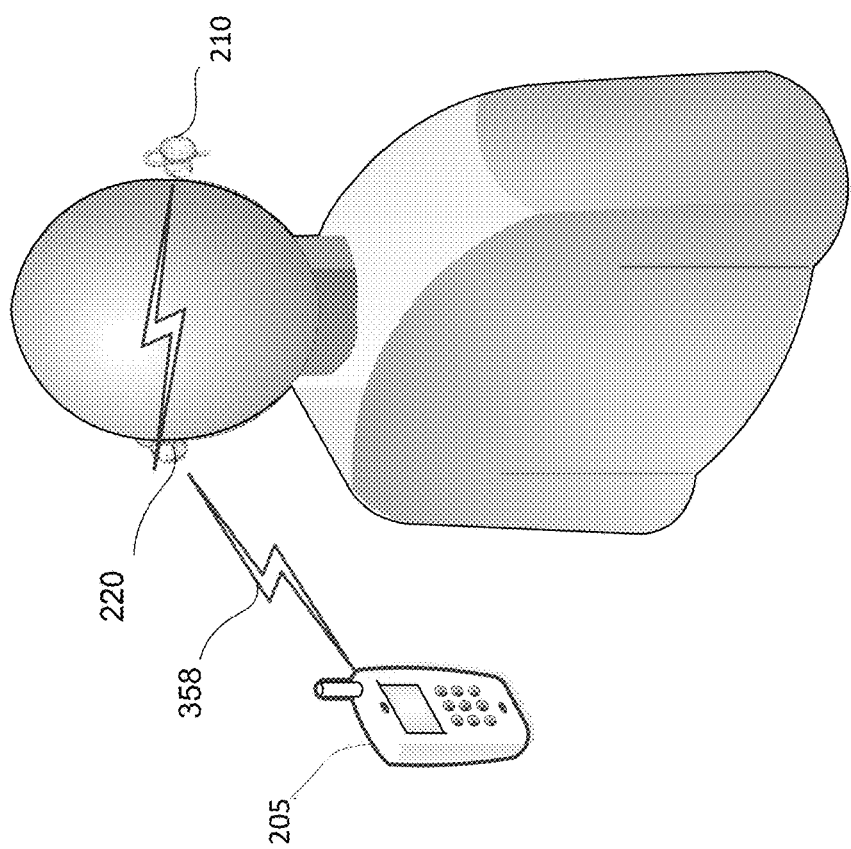

In FIG. 3E, the first and second devices 210, 220 have switched roles, such that the second device 220 is serving the master role. For example, the first and second devices 210, 220 may have reached the switch anchor point. As such, the second device 220 begins communicating with the host device 205 using the audio link header obtained in FIG. 3B. Because the second device 220 is using the same logical link address from the packet header from the first device 210, the host 205 may be unaware that it has begun communicating with a different device.

In FIG. 3F, when the second device has become the new master, audio decoder states may be sent from the first device 210 (the old master) to the second device 220 (the new master). This may allow for continuous decoding of audio packets on the second device 220 in the new master role.

Figure 4:
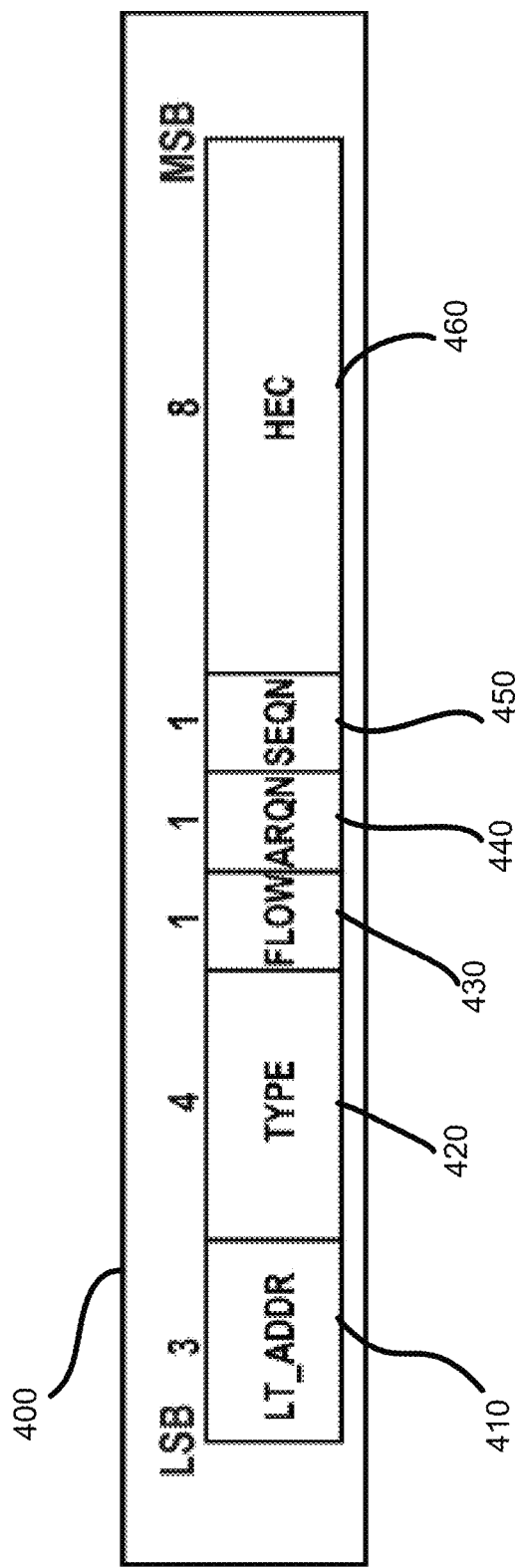
FIG. 4 is a block diagram illustrating an example packet header according to aspects of the disclosure.

FIG. 4 illustrates an example packet header 400 for short range wireless communications, such as Bluetooth. The packet header 400 may include a plurality of bits in a plurality of different fields. For example, such fields may include a logical transport (LT_ADDR) field 410, a type field 420, a flow field 430, an automatic repeat request number (ARQN) field 440, a sequence number field 450, and a header error check (HEC) field 460. It should be understood that these are merely examples of the fields included in the packet header 400, and that in other examples additional, fewer, or different fields may be included in the packet header.

The LT_ADDR field 410 refers to the host communication link between the host device and the master accessory device. For example, each accessory device may receive a default logical transport when it is paired with the host device. Each logical transport may include one or more logical links, for example, which may be distinguished by a logical link identifier.

The first device in the master role passes an audio link header, such as the header 400, for communicating with the host device to the second device in the slave role. Such link header may be passed between a time of a last packet from the host device to the master bud and a time of the switch anchor point. The second device may use the LT_ADDR field 410 to communicate over the logical transport. In this way, the second device can become master and act as the master starting at the switch anchor point. For example, the first and second devices may share the logical transport in that either device assumes communication over the logical transport, using the LT_ADDR from the packet header, when it is serving in the master role. The host device may be unaware of which device—the first or the second—is communicating over the logical transport at a given time, and may not notice a switch.

Figure 5:
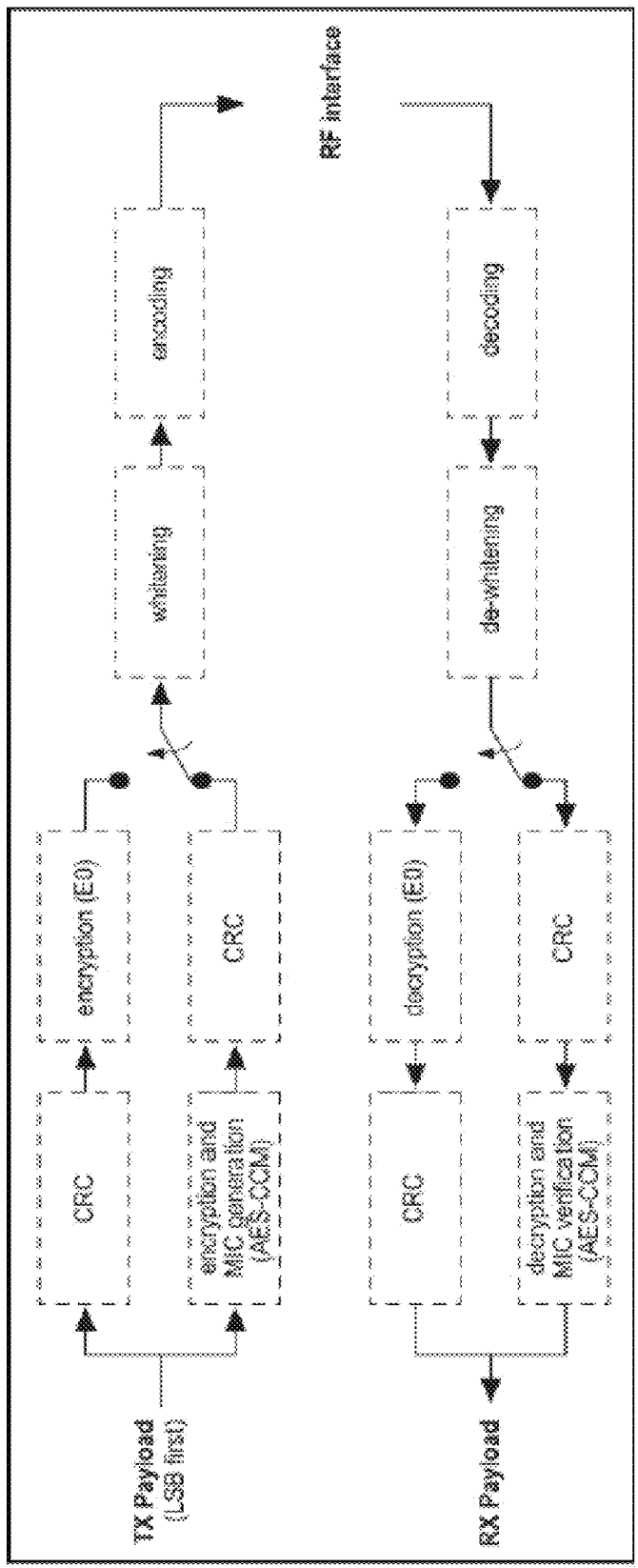
FIG. 5 is an example flow diagram illustrating an example bit processing procedure according to aspects of the disclosure.
Figure 6A:
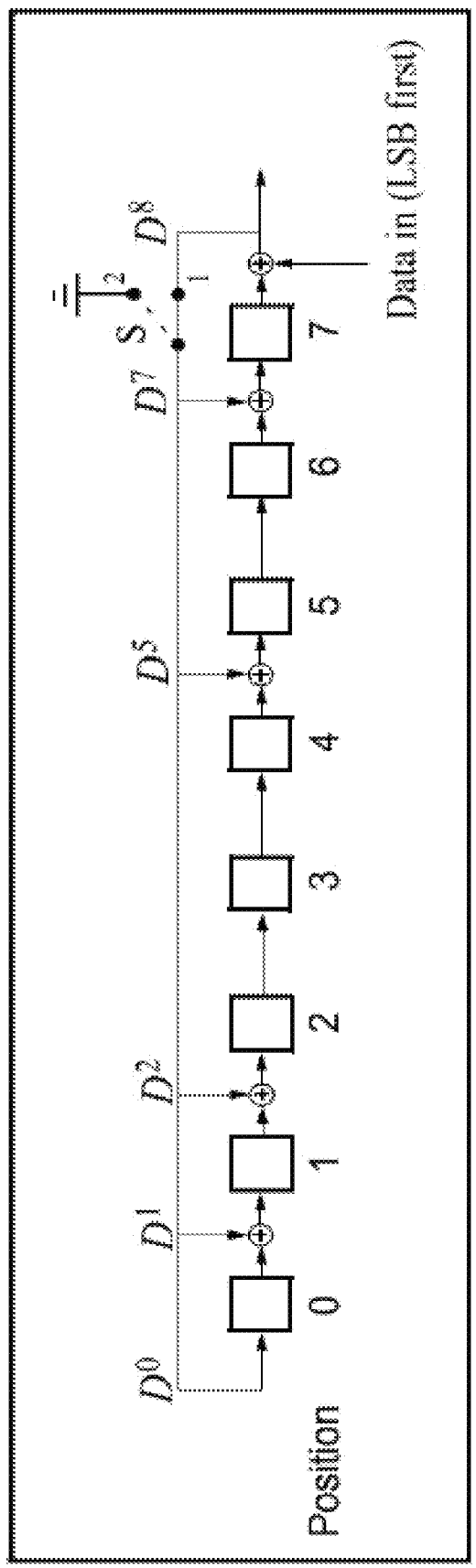
FIG. 6A is an example circuit diagram of a register for generating HEC states according to aspects of the disclosure.

FIG. 5 illustrates a packet bit stream formation process. To continue bit processing, cyclic redundancy check (CRC) and header error check (HEC) states from different randomization kernels are exchanged between the first and second devices. Each header may have an HEC to check the header integrity. The HEC may be, for example, an 8-bit word generated by an HEC generator, such as shown in FIG. 6A below. Before generating the HEC, the HEC generator is initialized with an 8-bit value, such as by using addresses or other information related to the first device, the second device, or packets sent therebetween. The generated HEC is checked, and if the HEC does not check, the entire packet may be discarded.

Packet bit streams may be formed using the CRC and HEC, such as shown in FIG. 5. For example, a payload of a packet is input, and after the payload CRC has been added, a header is added in front of the payload. The contents of the header are protected by HEC. For transmitting packets, the packet may be encrypted and then whitened. The encryption may be any of a variety of forms of encryption, such as AES-CCM, etc. Whitening may, for example, randomize the bit sequence such that its spectrum is almost like white noise. The result may then be encoded and transmitted to a radio frequency (RF) interface. For example, after the payload has been processed and the header has been added to the physical layer (PHY) packet, the PHY packet may be sent to an RF chain to do digital modulation and RF carrier modulation such that it can be transmitted at a predefined frequency. For receiving packets, the packets may be decoded, de-whitened, and decrypted to do CRC checking.

A state of the CRC and HEC changes with every packet that comes in. For example, the CRC and HEC may be generated by feeding information from the received packet into one or more seed control registers, such as a first linear feedback shift register (LFSR) to generate the updated CRC, and a second LFSR to generate the HEC.

FIG. 6A illustrates an example of a first LFSR circuit generating the HEC. Data, such as header bits, is input into the LFSR, for example with least significant bit first. After all header bits go through the LFSR, the read out from the LFSR is the HEC.

Figure 6B:
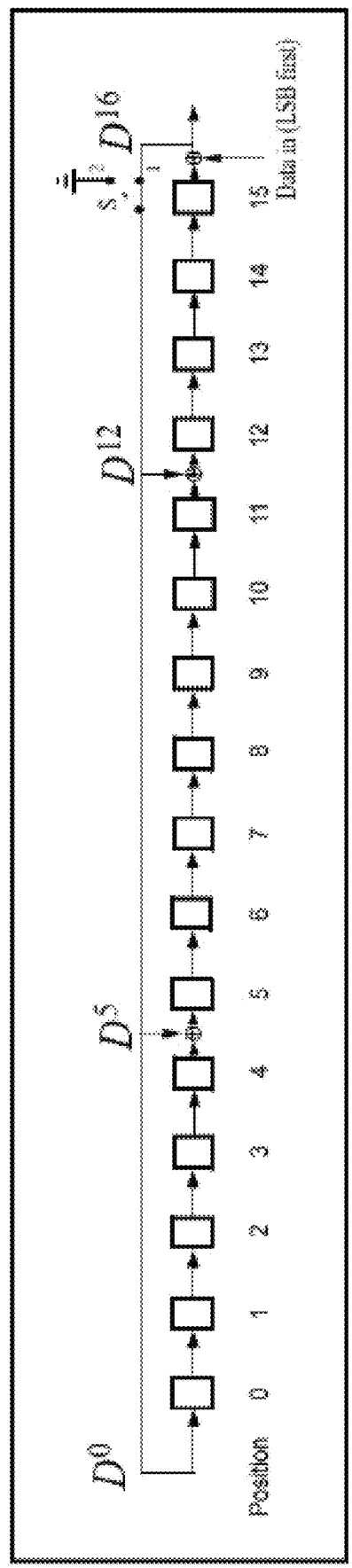
FIG. 6B is an example circuit diagram of a register for generating CRC states according to aspects of the disclosure.

FIG. 6B illustrates an example of a second LFSR circuit generating the CRC. Data, such as packet payload bits, is input into the LFSR, for example with least significant bit first. For example, a 16 bit LFSR for the CRC may be constructed similarly to the LFSR for the HEC. According to some examples, the 8 left-most bits may be initially loaded with an 8-bit UAP while the 8 right-most bits may be reset to zero. Switch S is set in position 1 while the data is shifted in. After the last bit has entered the LFSR, the switch is set in position 2, and the register's contents may be transmitted from right to left. The read out from the registers is the CRC.

The CRC and HEC may have different initial values at a beginning of first link establishment. As long as the latest state of the CRC/HEC can be written into the seed control register, the process can be carried out on master and slave buds that have switched roles without the host device knowing.

Figure 7:
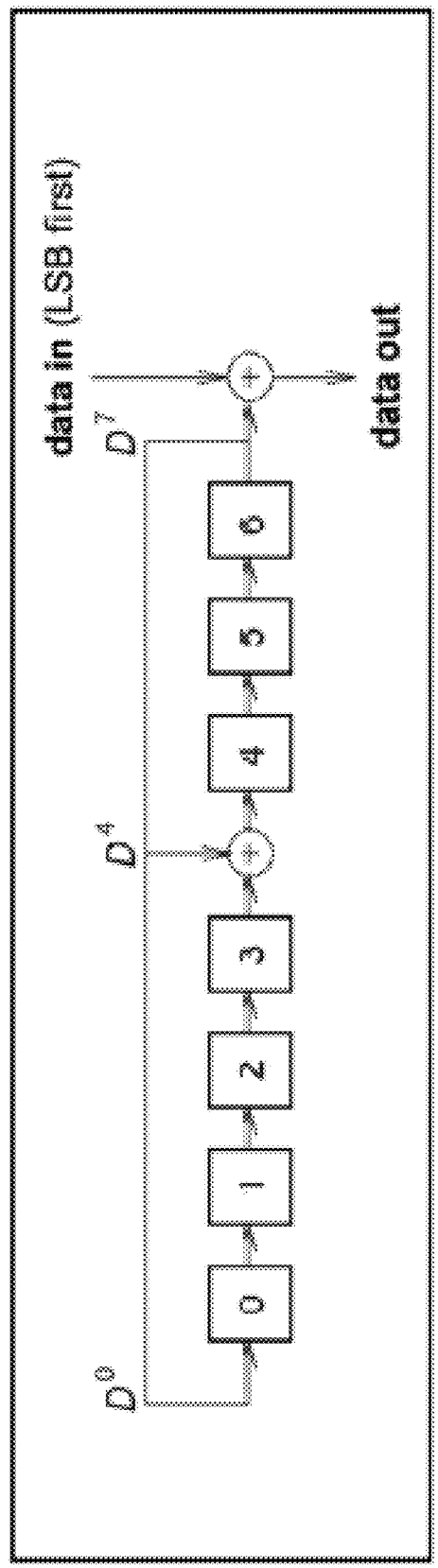
FIG. 7 is an example circuit diagram of a register for data whitening according to aspects of the disclosure.

FIG. 7 illustrates an example LFSR for data whitening. An original seed value for the whitening may be obtained from the master clock. Since the master bud, slave bud, and host device are all synchronized to the master clock, the whitening process does not require the master and slave buds to exchange extra state information.

The encryption may require information to be exchanged between the master and slave buds. To avoid this, before the role switch between the buds, the master bud can ask the host device for a role switch to stop encryption. This master bud and host role switch can be scheduled at the same time for master bud and slave bud role switch time to avoid additional time consumption for disabling the encryption. After the role switch, the new master bud can ask the host device to resume the encryption. In this way, all encryption seeds may start from an initial state such that the master and slave earbuds do not need to exchange the encryption engine states. If the role switch procedure takes longer than an approximate time interval between two audio packet deliveries from the host to an earbud, the master device can respond with a negative acknowledgement (NACK) to the host device. This is so even if the master device already received the packet, but wants to provide more time for completion of starting or stopping the encryption.

In order to let the second device communicate at the correct channel to the host device, the first device sends its alternative frequency hopping (AFH) channel map to the second device whenever the AFH channel map changes. The second device, before becoming master, may use the AFH channel map to listen to the host device, such as to update its measured signal strength with respect to the host device. If before the switch anchor point, the AFH channel map changes again in the first device, the first device sends the new AFH channel map to the second device before the switch anchor point, such that the second device can jump to the correct channel to communicate to the host device. In other examples, the first device may send the updated AFH channel map to the second device after the anchor point. The timing of whether the updated channel map is sent before or after the anchor may depend on, for example, whether the host will send a packet to the master at or soon after the anchor point.

After role switch, audio packets should be continuously decoded on the second device in its new master role. Accordingly, audio decoder states may be sent from the first device (old master) to the second device (new master). Depending on the codec used, this can lead to different amounts of data to be transferred. For example, different codecs may have encoder states of different complexity of encoder stat. By way of example only, an Advanced Audio Coding (AAC) codec may have a higher complexity as compared to a low complexity sub-band (SBC) codec. Accordingly, the codec state transfer may require different amounts of data depending on the codec. A simplified version is to put the decoder on the second device (new master) in the initial state. When the first packet comes in to the second device in its new master role, it will be decoded as if the decoder is from a fresh start. The decoder needs a frame to ramp up and give full scaled pulse-code modulation (PCM) stream. Ramping up in the middle of an audio stream will cause the audio stream to be silent for a short period. However, the first and second devices may understand that the short period of silence is because of the decoder initialization. Accordingly, for some types of traffic, the second device in its new master role can turn on a packet loss concealment (PLC) algorithm to smooth out the data at the beginning of the output of the decoder for the first frame that comes in from the host device to the second device (new master).

Figure 8:
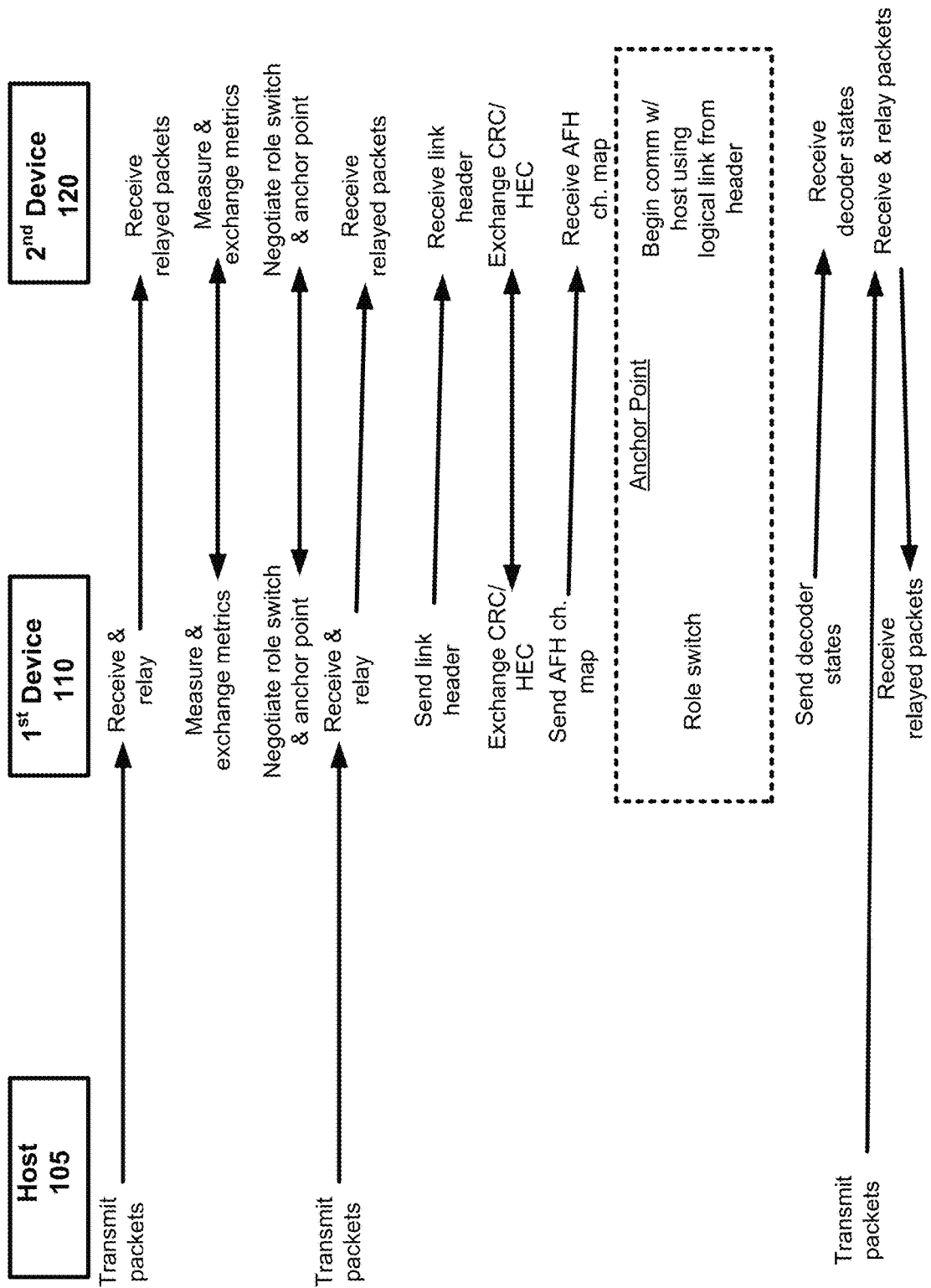
FIG. 8 is an example sequence diagram illustrating role switch according to aspects of the disclosure.

FIG. 8 provides an example sequence diagram illustrating a sequence of event leading up to, during, and following the role switch between the first and second devices. It should be understood that this is merely an example, and that in other examples the order of events may differ or events may occur simultaneously.

As shown, the host device 105 transmits packets to the first device 110 serving in the master role, which relays the received packets to the second device 120 serving in the slave role. The first and second devices 110, 120 measure and exchange metrics, such as signal strength vis-à-vis the host device, battery life, etc. Depending on the metrics, the first and second devices negotiate whether to perform a role switch, and if so further negotiate a switch anchor point.

The first and second devices 110, 120 may continue to receive and relay packets from the host 105 as they prepare for role switch prior to the anchor point. In preparation for the role switch, the first device 110 may send a packet header including logical link information for communicating with the host device. For example, the packet header may be sent prior to the audio data packets relayed from the host device. The logical link information may be, for example, a LT_ADDR field.

The first and second devices 110, 120 exchange HEC and CRC status information. Further, the first device 110 sends its AFH channel map. While the map is illustrated as being sent before the anchor point, it may be sent after the anchor point in other examples. Moreover, it should be understood that the HEC/CRC information and AFH channel map may be sent at multiple times, such as each time they are updated.

At the anchor point, the first and second devices 110, 120 perform role switch, such that the second device 120 becomes the master with respect to the first device 110 and the first device 110 becomes the slave. Accordingly, the second device 120 may begin communicating directly with the host 105 using the logical link information received in the packet header.

The first device 110 may send decode information to the second device 120 for decoding packets received at the second device 120 from the host 105. Accordingly, the second device 120 may serve in the master role, and receive packets from the host 105 and relay the packets to the first device 110.

Figure 9:
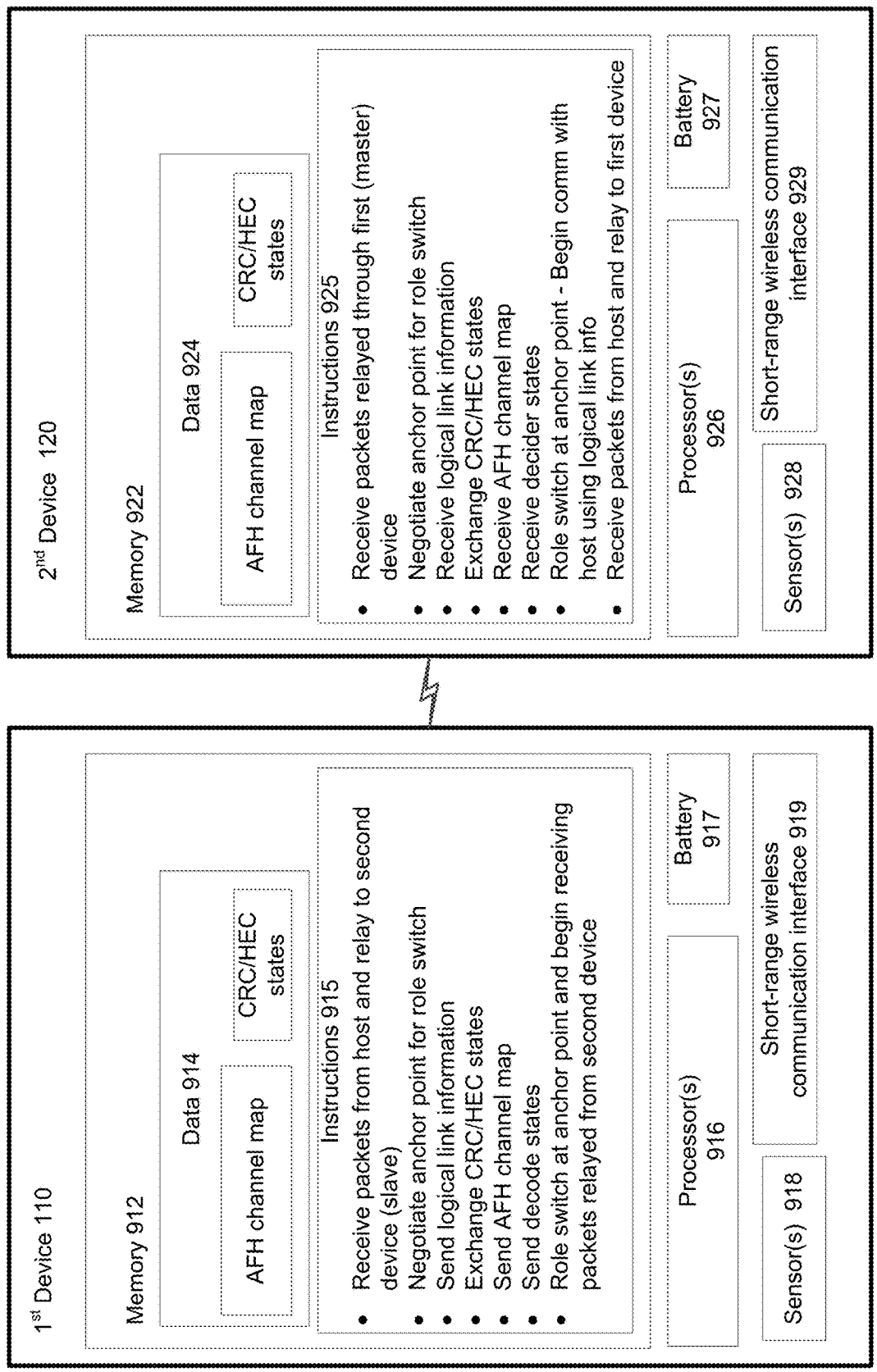
FIG. 9 is a functional block diagram illustrating an example system according to aspects of the disclosure.

FIG. 9 illustrates an example of internal components of the first device 110 and second device 120. While a number of internal components are shown, it should be understood that additional or fewer components may be included. By way of example only, the devices may include components typically found in playback devices, such as speakers, microphones, etc. The devices may be, for example, wireless accessories, such as earbuds, speakers, displays, etc. The devices are primarily described below with respect to the first device 110. While the second device 120 may be similar or identical to the first device 110 in some examples, in other examples the second device 120 may be a different type of device. Additionally or alternatively, the second device 120 may have different internal components.

The first device 110 may include one or more processors 916, one or more memories 912, as well as other components. For example, the computing device 110 may include one or more sensors 918, wireless pairing interface 919, and a battery 917.

The memory 912 may store information accessible by the one or more processors 916, including data 914 instructions 915 that may be executed or otherwise used by the one or more processors 916. For example, memory 912 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 912 may be a static random-access memory (SRAM) configured to provide fast lookups. Systems and methods may include different combinations of the foregoing, whereby different portions of the instructions and data are stored on different types of media.

The data 914 may be retrieved, stored or modified by the one or more processors 916 in accordance with the instructions 915. For instance, data 914 may include short range wireless communication profiles, such as Bluetooth profiles. The data 914 may further include buffered packets, such as an audio buffer with packets received from a host device. Although the claimed subject matter is not limited by any particular data structure, the data may be stored in computing device registers, in a relational database as a table having a plurality of different fields and records, XML documents or flat files. The data may also be formatted in any computing device-readable format.

The instructions 915 may be any set of instructions to be executed directly (such as machine code) or indirectly (such as scripts) by the one or more processors 916. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 916 may be microprocessors, logic circuitry (e.g., logic gates, flip-flops, etc.) hard-wired into the device 110 itself, or may be a dedicated application specific integrated circuit (ASIC). It should be understood that the one or more processors 916 are not limited to hard-wired logic circuitry, but may also include any commercially available processing unit, or any hardware-based processors, such as a field programmable gate array (FPGA). In some examples, the one or more processors 916 may include a state machine. The processors 916 may be configured to execute the instruction 915 to, for example, perform a method such as described below in connection with FIG. 10.

The one or more sensors 918 may include any of a variety of mechanical or electromechanical sensors for detecting conditions relevant to a role switch. Such sensors may include, for example, an accelerometer, gyroscope, switch, light sensor, barometer, audio sensor (e.g., microphone), vibration sensor, heat sensor, radio frequency (RF) sensor, etc. In this regard, the device 110 may detect conditions indicating that the device should switch roles with its paired device. As one example, the sensors may detect received signal strength, and may compare the received signal strength to that of the paired device. The device 110 and its paired device may thus negotiate whether to switch roles. As another example, the sensors may detect other parameters, such as battery life, signal quality, movement, etc.

The short range wireless pairing interface 919 may be used to form connections with other devices, such as paired second device 120 or a host device, such as a mobile phone providing the audio packets. The connection may be, for example, a Bluetooth connection or any other type of wireless pairing. By way of example only, each connection may include an ACL link.

Although FIG. 9 functionally illustrates the processor, memory, and other elements of device 110 as being within the same block, it will be understood by those of ordinary skill in the art that the processor and memory may actually include multiple processors and memories that may or may not be stored within the same physical housing. For example, memory 912 may be a volatile memory or other type of memory located in a casing different from that of computing device 110. Moreover, the various components described above may be part of one or more electronic devices.

In this example, the second device 120 has an internal architecture similar to that of the device 110. For example, the second device 120 includes a memory 922 storing data 924 and instructions 925 which may be executed by one or more processors 926. The second device 120 further includes a battery 927, sensors 928, a communication interface 929, such as a Bluetooth interface, etc. While the second device 120 is shown as executing a different set of instructions 925 than the instructions 915 of the first device 110, it should be understood that both devices 110, 120 may be programmed to perform role switch from primary to secondary and from secondary to primary.

As mentioned above, the instructions 915 and 925 may be executed to perform a seamless role switch. The role switch may be performed at a negotiated anchor point, and may be performed without notifying, updating, or otherwise involving the host device.

Figure 10:
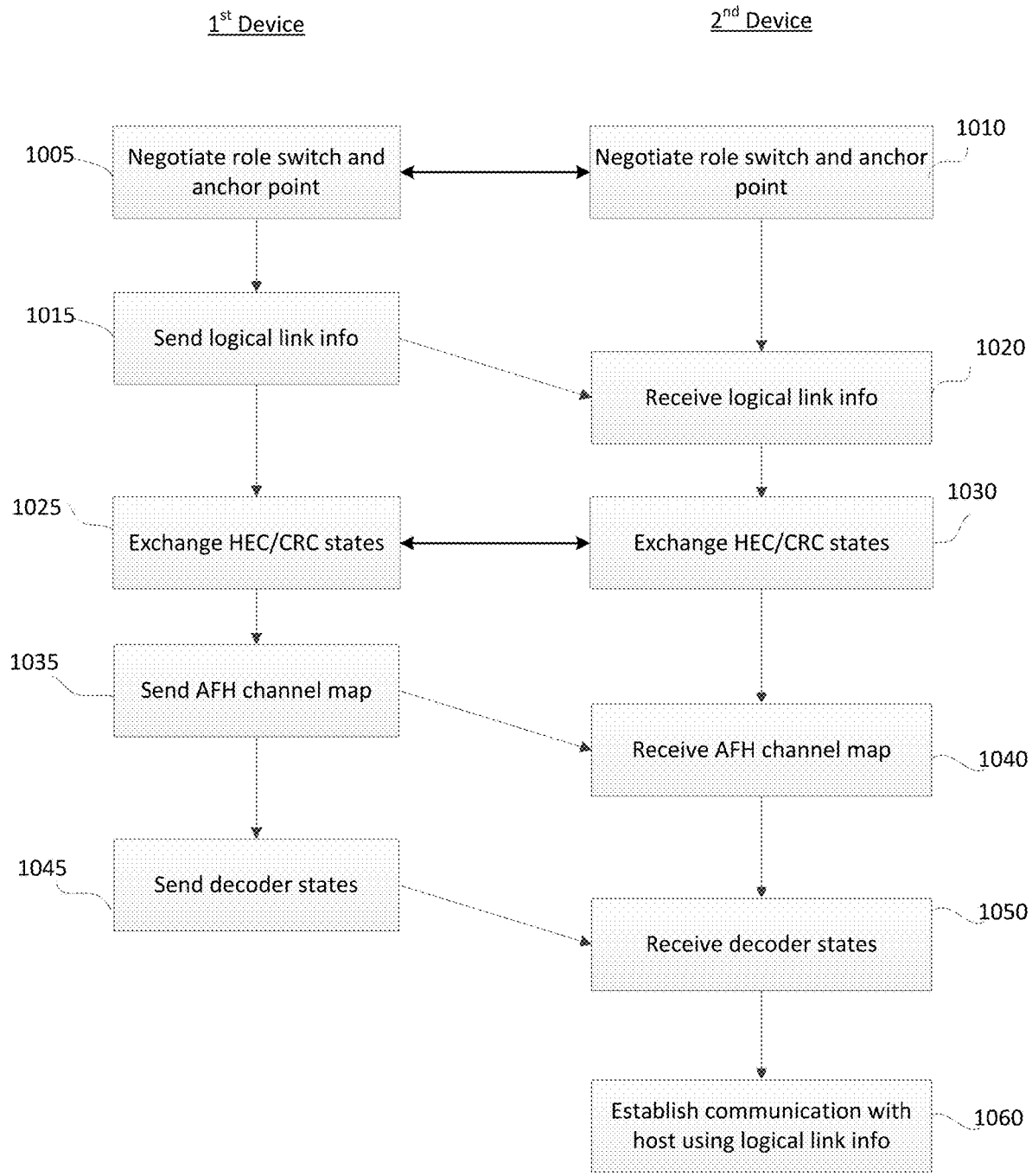
FIG. 10 is a flow diagram illustrating an example method according to aspects of the disclosure.

FIG. 10 is a flow diagram illustrating an example method 1000 of performing a role switch between a first wireless accessory and a second wireless accessory. As mentioned above, the first and second devices may be any of a number of types of devices. For example, the first and second devices may be a pair of earbuds, surround sound speakers, etc. While the operations are illustrated and described in a particular order, it should be understood that the order may be modified and that operations may be added or omitted.

In blocks 1005, 1010, the first and second devices negotiate whether to switch roles. For example, one or both devices may compare their signal strength or other conditions measured by the first and second devices. When the devices determine that role switch should be performed, the devices further negotiate a switch time anchor point. The anchor point may be selected based on, for example, a predetermined delay allowing enough time for preparation for the role switch, a random time, a time when role switch would have a least impact on signal quality, or any of a variety of other factors.

In block 1015, the first device sends logical link information, which is received by the second device in block 1020. The logical link information may be sent in, for example, a packet header. For example, the logical ink information may be included in a LT_ADDR field of the packet header. The logical link information may be the information used by the first device to communicate with a host device. By sharing the information with the second device, the first device allows the second device to use the logical link information to communicate with the host device after role switch.

In blocks 1025, 1030, the first and second devices exchange HEC/CRC states, thereby enabling continued bit error processing after role switch.

In block 1035, the first device sends AFH channel map, which is received by the second device in block 1040. In block 1045, the first device sends decoder states, which are received by the second device in block 1050. Such decoder states may be used by the second device after role switch to decode packets received from the host device.

When the devices reach the predetermined switch anchor point, they may switch roles. Accordingly, in block 1060, the second device begins communicating directly with the host device using the logical link information received in block 1020. The first device transitions to a slave role. As such, packets received at the second device from the host are relayed to the first device. The host device may be unaware that the role switch occurred.

The foregoing systems and methods are advantageous in that they provide for role switch without perceivable glitches in audio. As such, master/slave roles between paired devices may be switched as frequently as would be beneficial without compromising audio quality. Such switching may have to preserve battery life, improve audio quality (e.g., as a result of improved signal strength), etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A wireless accessory device, comprising:
a wireless communication interface adapted for communication with a host device and a second wireless accessory device;
a memory;
one or more processors in communication with the memory, the one or more processors configured to execute a first set of operations to role switch from a master mode to a slave mode, the first set of operations comprising:
negotiating an anchor point for a role switch;
transmitting logical link information for communicating with the host device to the second wireless accessory device;
transmitting bit processing information to the second wireless accessory device, the bit processing information comprising cyclic redundancy check and header error check states;
performing role switch at the negotiated anchor point; and
receiving packets relayed through the second wireless accessory device after the anchor point.

2. The wireless accessory device of claim 1, wherein the bit processing information further comprises decoder states.

3. The wireless accessory device of claim 1, wherein the one or more processors further send an adaptive frequency hopping (AFH) channel map.

4. The wireless accessory device of claim 1, wherein the one or more processors are further configured to execute a second set of operations to role switch from the slave mode to the master mode, the second set of operations comprising:
negotiating a second anchor point for role switch;
receiving logical link information from the second wireless accessory device for communicating with the host device;
receiving bit processing information from the second wireless accessory device;
assuming the master mode at the negotiated anchor point;
receiving packets directly from the host device after the switch anchor point; and
relaying the received packets to the second wireless accessory device.

5. The wireless accessory device of claim 4, wherein receiving the bit processing information comprises exchanging cyclic redundancy check and header error check states with the second wireless accessory device.

6. The wireless accessory device of claim 4, wherein the bit processing information comprises decoder states.

7. The wireless accessory device of claim 4, wherein the one or more processors further receive an adaptive frequency hopping (AFH) channel map.

8. The wireless accessory device of claim 1, wherein the anchor point is at a time of predetermined length in the future, wherein the predetermined length corresponds to an amount of time needed for sending the logical link information and sending the bit processing information.

9. The wireless accessory device of claim 1, wherein the anchor point corresponds to a particular event.

10. A method for role switching from a slave role to a master role, comprising:
- negotiating, using one or more processors, an anchor point for a role switch;
- receiving logical link information from a wirelessly paired device in the master role, the logical link information for communicating with a host device;
- receiving, from the wirelessly paired device in the master role, bit processing information, the bit processing information comprising cyclic redundancy check and header error check states;
- establishing direct communication with the host device using the received logical link information, at or after the anchor point; and
- receiving packets directly from the host device after the switch anchor point.

11. The method of claim 10, wherein the bit processing information further comprises decoder states.

12. The method of claim 10, further comprising receiving an adaptive frequency hopping (AFH) channel map.

13. A method for role switching from a master mode to a slave mode, the method comprising:
- negotiating, by one or more processors of a first device operating in the master mode, an anchor point for a role switch;
- transmitting, by the one or more processors, logical link information for communicating with a host device to a second device operating in the slave mode;
- transmitting, by the one or more processors, bit processing information to the second device, the bit processing information comprising cyclic redundancy check and header error check states;
- performing role switch to the slave mode at the negotiated anchor point; and
- receiving packets relayed through the second device after the anchor point.

14. The method of claim 13, wherein the bit processing information further comprises decoder states.

15. The method of claim 13, further comprising sending an adaptive frequency hopping (AFH) channel map.

16. The method of claim 10, wherein the anchor point is at a time of predetermined length in the future, wherein the predetermined length corresponds to an amount of time needed for sending the logical link information and sending the bit processing information.

17. The method of claim 10, wherein the anchor point corresponds to a particular event.

18. The method of claim 13, wherein the anchor point is at a time of predetermined length in the future, wherein the predetermined length corresponds to an amount of time needed for sending the logical link information and sending the bit processing information.

19. The wireless accessory device of claim 1, wherein the wireless accessory device is a first earbud of a pair of wireless earbuds and the second wireless accessory device is a second earbud of the pair of wireless earbuds.

20. The method of claim 13, further comprising determining, by the one or more processors, that the role switch is to be performed, the determination based on a signal strength of the first device, a signal strength of the second device, a battery level of the first device, or a battery level of the second device.

* * * * *